(12) United States Patent
Xiang

(10) Patent No.: US 9,969,616 B2
(45) Date of Patent: May 15, 2018

(54) REFORMER OF DEVICE PREPARING HYDROGEN WITH METHANOL AND WATER AND MANUFACTURE PROCESS THEREOF

(71) Applicant: GUANGDONG HYDROGEN ENERGY SCIENCE AND TECHNOLOGY CO., LTD, Dongguan (CN)

(72) Inventor: Hua Xiang, Dongguan (CN)

(73) Assignee: GUANGDONG HYDROGEN ENERGY SCIENCE AND TECHNOLOGY C, Dongguan (CN)

( * ) Notice: Subject to any disclaimer, the term of this patent is extended or adjusted under 35 U.S.C. 154(b) by 174 days.

(21) Appl. No.: 15/228,181

(22) Filed: Aug. 4, 2016

(65) Prior Publication Data

US 2016/0340185 A1 Nov. 24, 2016

Related U.S. Application Data

(63) Continuation of application No. PCT/CN2015/077343, filed on Apr. 24, 2015.

(30) Foreign Application Priority Data

Jul. 2, 2014 (CN) .......................... 2014 1 0311217

(51) Int. Cl.
*C01B 3/32* (2006.01)
*B01J 19/02* (2006.01)
(Continued)

(52) U.S. Cl.
CPC .................. *C01B 3/323* (2013.01); *B01J 7/02* (2013.01); *B01J 8/0285* (2013.01); *B01J 19/02* (2013.01);
(Continued)

(58) Field of Classification Search
CPC ................ B01J 19/02; B02J 7/02; C01B 3/32
See application file for complete search history.

(56) References Cited

U.S. PATENT DOCUMENTS

| 2,973,252 A * | 2/1961 | Shields ................... B01J 8/008 196/133 |
| 2008/0071109 A1 * | 3/2008 | Yada ........................ B01J 8/067 562/512.2 |

(Continued)

*Primary Examiner* — Matthew J Merkling
(74) *Attorney, Agent, or Firm* — Hemisphere Law, PLLC; Zhigang Ma

(57) ABSTRACT

The disclosure discloses a reformer of a device for preparing hydrogen with methanol and water and a manufacture process thereof, relating to the device for preparing hydrogen with methanol and water technical field. The reformer of the device for preparing hydrogen with methanol and water includes a reforming housing, the reforming housing includes a stainless steel internal shell, a thermal insulation layer and a mica external shell from inside to outside in sequence, a ratio of a diameter of the reforming housing to a thickness of the stainless steel internal shell is 150: 0.8~150:2.5, a ratio of the diameter of the reforming housing to a thickness of the thermal insulation layer is 150:10~150: 20, a ratio of the diameter of the reforming housing to a thickness of the mica external shell is 150:1.5~150:3.5. Advantages of the disclosure include thermal preservation, high strength, corrosion resistance, lightweight, etc.

14 Claims, 6 Drawing Sheets

(51) Int. Cl.
*B01J 7/02* (2006.01)
*B01J 8/02* (2006.01)
(52) U.S. Cl.
CPC ........... *B01J 2208/00495* (2013.01); *B01J 2208/00504* (2013.01); *B01J 2219/0277* (2013.01); *C01B 2203/0216* (2013.01); *C01B 2203/0233* (2013.01); *C01B 2203/0283* (2013.01); *C01B 2203/0822* (2013.01); *C01B 2203/1223* (2013.01); *Y02P 20/128* (2015.11)

(56) References Cited

U.S. PATENT DOCUMENTS

2014/0010751 A1* 1/2014 Bogenstatter ............ B01J 19/02
423/532
2015/0136001 A1* 5/2015 Hoyt ...................... F27D 1/004
110/338

* cited by examiner

REFORMER OF DEVICE PREPARING HYDROGEN WITH METHANOL AND WATER AND MANUFACTURE PROCESS THEREOF

FIELD OF THE DISCLOSURE

The disclosure relates to a device for preparing hydrogen with methanol and water technical field, and more particularly to a reformer of a device for preparing hydrogen with methanol and water, meanwhile, the disclosure further relates to a manufacture process of the reformer.

BACKGROUND OF THE DISCLOSURE

Hydrogen is one of the most ideal energy sources in $21^{st}$ century, hydrogen generates the most amount of energy under the circumstance of burning the same weight of coal, gasoline and hydrogen, and the product of combustion is water without ashes or emissions, which will not harm the environment; products of combustion of burning coal and petroleum are primarily $CO_2$ and $SO_2$, which cause the greenhouse effect and the acid rain respectively. Reserves of coal and petroleum are restricted, hydrogen is primarily reserved in water, and water is the only product of combustion, which can generate hydrogen continuously without limitation. Hydrogen is spread widely, water is the warehouse of hydrogen, with 11% hydrogen included. The soil contains 1.5% hydrogen; hydrogen can be found in petroleum, coal, natural gas, animals and plants. Hydrogen primarily exists in a form of water, and water covers 70% surface of the earth, which is considerable, therefore, hydrogen is a limitless resource. Hydrogen will be an inexpensive energy source if it can be produced by a proper method.

At present, an annual yield of hydrogen worldwide is around 36 thousand tons, hydrogen is primarily prepared by two methods: one is prepared by petroleum, coal and natural gas, which will consume limited mineral fuels, and most hydrogen is generated by the manner; the other is prepared by the method of electrolysis of water, which consumes a great deal of electric energy and is not economic, around 4% hydrogen is produced by the method. The technology that prepares hydrogen with methanol and water is improved with the development of technique, which can reduce energy consumption and costs in chemical production, hopefully substituting the process of electrolysis of water generating hydrogen that requires a large amount of electric energy. Hybrid gases of $H_2$ and $CO_2$ are obtained by advanced reforming technology of producing hydrogen with methanol and water, $H_2$ and $CO_2$ can be separated by a palladium membrane separator.

Referring to Chinese patent application No. 201310340475.0 (applicant: SHANGHAI HEJI DEDONG HYDROGEN MACHINE CO LTD), methanol and water vapor undergo methanol decomposition and a reaction of carbon monoxide in a temperature of 350-409° C. and a pressure of 1-5 MPa with assistance of a catalyst, producing hydrogen and carbon oxide, which is a multi-componential, multi-reactional catalytic system with gases and solids. Reaction equations are as follows:

$$CH_3OH \rightarrow CO + 2H_2 \quad (1)$$

$$H_2O + CO \rightarrow CO_2 + H_2 \quad (2)$$

$$CH_3OH + H_2O \rightarrow CO_2 + 3H_2 \quad (3)$$

$H_2$ and $CO_2$ generated by the reforming reaction are separated by the palladium membrane separator of a separation chamber, highly purified hydrogen can be achieved.

In the entire process of producing hydrogen, the reformer of the device producing hydrogen with methanol and water is the most critical hydrogen preparation device, the reformer includes a reforming housing and a combustion chamber and a reforming chamber in the reforming housing, generally, a temperature in the reforming chamber is 350-409° C., a temperature in the combustion chamber is 405-570° C., obviously, if an error occurs, the temperature in the reforming chamber or the combustion chamber can soar up to more than 1000° C. in a short period. The housing and base of a conventional reformer of a device for preparing hydrogen with methanol and water is produced by stainless steel, albeit with high strength and thermal stability, however, the housing and base of the reformer made out of stainless steel have following disadvantages: first, corrosion and oxidation easily occur under the circumstance of preparing hydrogen; second, thermal preservation is poor, heat loss is considerable, as stainless steel is thermal conductive, heat in the reforming chamber and the combustion chamber can be lost by being conducted through the stainless steel housing and base; third, as the temperature of the stainless steel housing and base is high, other components of the device producing hydrogen with methanol and water (i.e. a solid hydrogen reservoir, a methanol and water storage container, a resource transportation device, etc.) can be destroyed by high temperature of the housing and base of the reformer, so that performance and endurance will be impacted; fourth, as the device for preparing hydrogen with methanol and water is a vital device of an electrical generation system with methanol and water, and the electrical generation system with methanol and water also includes electric components such as a control system, a fuel cell (a galvanic pile), an inverter, an electromagnetic valve, an atmospheric pressure regulator, therefore, conductivity of the housing and base of the reformer can influence circuit design of the electrical generation system with methanol and water, even can cause a short circuit of the electrical generation system with methanol and water; fifth, the stainless steel housing and base of the reformer are heavy, which bring inconvenience to transportation of the hydrogen production device.

SUMMARY OF THE DISCLOSURE

The technical problem to be solved by the disclosure is aiming at the disadvantages of the conventional technique above to provide a reformer of a device for preparing hydrogen with methanol and water, which is thermally stable with high strength, and thermal insulated, corrosion and oxidation resistant, water proof, non-conductive, lightweight. Meanwhile, the disclosure further provides a manufacture process of the device for preparing hydrogen with methanol and water.

To solve the technical problem above, the disclosure provides a reformer of a device for preparing hydrogen with methanol and water, including a reforming housing, the reforming housing includes a stainless steel internal shell, a thermal insulation layer and a mica external shell from inside to outside in sequence, a ratio of a diameter of the reforming housing to a thickness of the stainless steel internal shell is 150:0.8~150:2.5, a ratio of the diameter of the reforming housing to a thickness of the thermal insulation layer is 150:10~150:20, a ratio of the diameter of the reforming housing to a thickness of the mica external shell is 150:1.5~150:3.5.

The ratio of the diameter of the reforming housing to the thickness of the stainless steel internal shell is 150:1.5~150:2, the ratio of the diameter of the reforming housing to the thickness of the thermal insulation layer is 150:14~150:16, the ratio of the diameter of the reforming housing to the thickness of the mica external shell is 150:2~150:3.

The reformer further includes a reforming base and an exhaust device, the reforming base is connected with a bottom of the reforming housing, the reforming base is a mica base; the exhaust device is disposed on top of the reforming housing, the exhaust device includes an exhaust pipe and a check valve mounted in the exhaust pipe, the exhaust pipe is a mica exhaust pipe, the check valve is a mica check valve.

The mica external shell of the reforming housing has a bottom belt, the bottom belt has a plurality of mounting holes, and a bolt is screwed in each of the plurality of mounting holes respectively, in order to secure the mica external shell on the reforming base.

A manufacture process of the reformer of the device for preparing hydrogen with methanol and water includes a process of manufacturing the mica external shell of the reforming housing, a process of manufacturing the thermal insulation layer of the reforming housing and a process of manufacturing the stainless steel internal shell of the reforming housing, the process of manufacturing the mica external shell of the reforming housing includes following steps.

(1) Crushing and grinding mica, aluminosilicate, carbonate and high refractory inorganic mineral respectively to be powders with a size of 50 μm~300 μm, in a scale of 100 as the whole weight, weighing each material according to 35%~45% mica, 25%~35% aluminosilicate, 10%~15% carbonate and 5%~15% high refractory inorganic mineral in sequence and blending previous weighted materials evenly to be blended materials.

(2) Adding 10~15% adhesive by weight that of total weight of the blended materials to bond the blended materials to be bonded material.

(3) Pressing the bonded material to be a semi-finished product of the mica external shell with a pressure of 15~25 Mpa.

(4) Placing the semi-finished product of the mica external shell in a heater, heating for 3~4 hours with a temperature of 60~200° C., the temperature being gradually increased, then heating for 1~2 hours with a temperature of 600~900° C., taken out of the heater and cooled till room temperature, obtaining the mica external shell.

The manufacture process of the reformer of the device for preparing hydrogen with methanol and water further includes a manufacture process of a mica base, a mica exhaust pipe and a mica check valve of the reformer, the manufacture process includes following steps.

(1) Crushing and grinding mica, aluminosilicate, carbonate and high refractory inorganic mineral respectively to be powders with a size of 50 μm~300 μm, in a scale of 100 as the whole weight, weighing each material according to 35%~45% mica, 25%~35% aluminosilicate, 10%~15% carbonate and 5%~15% high refractory inorganic mineral in sequence and blending previous weighted materials evenly to be blended materials.

(2) Adding 10~15% adhesive by weight that of total weight of the blended materials to bond the blended materials.

(3) pressing previous bonded materials to be a semi-finished product of the mica base, a semi-finished product of the mica exhaust pipe and a semi-finished product of the mica check valve with a pressure of 15~25 Mpa.

(4) Placing the semi-finished product of the mica base, the semi-finished product of the mica exhaust pipe and the semi-finished product of the mica check valve in a heater, heating for 3~4 hours with a temperature of 60~200° C., the temperature being gradually increased, then heating for 1~2 hours with a temperature of 600~900° C., taken out of the heater and cooled till room temperature, obtaining the mica base, the mica exhaust pipe and the mica check valve.

The aluminosilicate is made of one or more materials selected from the group consisting of kaolinite, pyrophyllite, and montmorillonite, and any combinations thereof.

The carbonate is made of one or more materials selected from the group consisting of calcite, dolomite, and magnesite, and any combinations thereof.

The high refractory inorganic mineral is made of one or more materials selected from the group consisting of periclase, quartz, and quartz stone, and any combinations thereof.

The adhesive is made of one or more materials selected from the group consisting of sodium silicate, epoxy resin, silane, and any combinations thereof.

Beneficial effects of the disclosure: first, the reformer with the mica housing and the mica base can resist corrosion and oxidation during preparing hydrogen; second, the thermal insulation layer preserves heat, the mica housing also preserves heat, which make the reformer to be excellent in heat preservation, heat in the reforming chamber and the combustion chamber is not easily lost due to the conductivity of the housing; third, as the mica housing and the mica base are not thermal conductive, the temperature of surfaces of which is low, so that the disclosure will not impact operation and endurance of other components (i.e. a solid hydrogen reservoir, a methanol and water storage container, a resource transportation device, etc.) of the device for preparing hydrogen with methanol and water; fourth, as the mica housing and the mica base have an insulation property, the disclosure will not influence electric design of a component such as a control system, a fuel cell (a galvanic pile), an inverter, an electromagnetic valve, an atmospheric pressure regulator during applied in the electrical generation system with methanol and water, or cause a short circuit of the electrical generation system with methanol and water; fifth, the mica housing and the mica base are light, comparably ⅙ the weight of the stainless steel housing, so as to provide convenience for transportation of the hydrogen production device; sixth, as the mica check valve is light, when gas is exhausted from the reformer, the check valve is easy to be blown open; sixth, strength of the mica housing is high, and a stainless steel internal shell is in the reforming housing, which can guarantee the strength of the reformer to the maximum extent.

Figure 1:
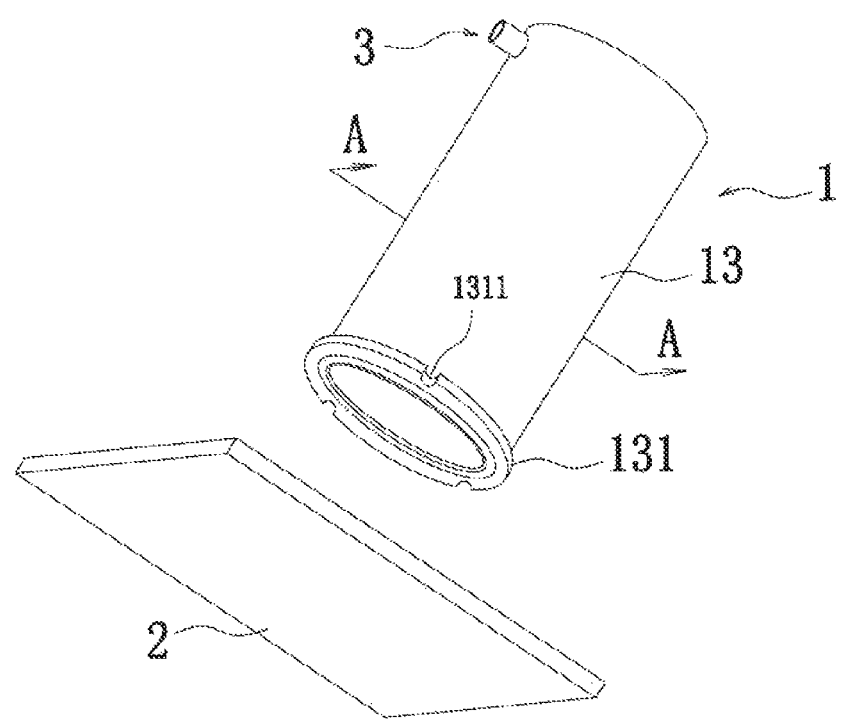
FIG. 1 is a schematic, structural view of a separated reformer according to the disclosure.

In the figures: 1. reforming housing; 2. stainless steel internal shell; 12. thermal insulation layer; 13. mica external shell; 2. reforming base; 3. exhaust device; 31. exhaust pipe; 32. check valve; 5. reforming chamber; 6. combustion chamber; 131. bottom belt; 1311. mounting holes; 132. bolt.

DETAILED DESCRIPTION OF PREFERRED EMBODIMENTS

Structures and operational principle of the disclosure are described in detail with reference to the accompanying drawings as follows.

Embodiment one: a reformer of a device producing hydrogen with methanol and water is shown in FIG. 1 to FIG. 4, a reforming chamber 5 and a combustion chamber 6 are disposed in the reformer, in the reforming chamber 5, methanol and water vapor undergo methanol decomposition and a reaction of carbon monoxide in the presence of a catalyst, producing hydrogen and carbon oxide, a temperature in the reforming chamber 5 is 350-409° C.; in the combustion chamber 6, hydrogen is burned to provide heat to the reforming chamber 5, a temperature in the combustion chamber is 405-570° C. The reformer includes a reforming housing 1, the reforming housing 1 includes a stainless steel internal shell 11, a thermal insulation layer 12 and a mica external shell 13 from inside to outside in sequence, a ratio of a diameter of the reforming housing 1 to a thickness of the stainless steel internal shell 11 is 150:0.8~150:2.5, a ratio of the diameter of the reforming housing 1 to a thickness of the thermal insulation layer 12 is 150:10~150:20, a ratio of the diameter of the reforming housing 1 to a thickness of the mica external shell 13 is 150:1.5~150:3.5, for instance, the diameter of the reforming housing 1 is 150 mm, the thickness of the stainless steel internal shell 11 is 1.5 mm, the thickness of the thermal insulation layer 12 is 15 mm, the thickness of the mica external shell 13 is 3 mm.

As a preferred embodiment of the reforming housing 1, the ratio of the diameter of the reforming housing to the thickness of the stainless steel internal shell is 150:1.5~150:2, the ratio of the diameter of the reforming housing to the thickness of the thermal insulation layer is 150:14~150:16, the ratio of the diameter of the reforming housing to the thickness of the mica external shell is 150:2~150:3, which can guarantee the strength of the reformer to the maximum extent.

Figure 2:
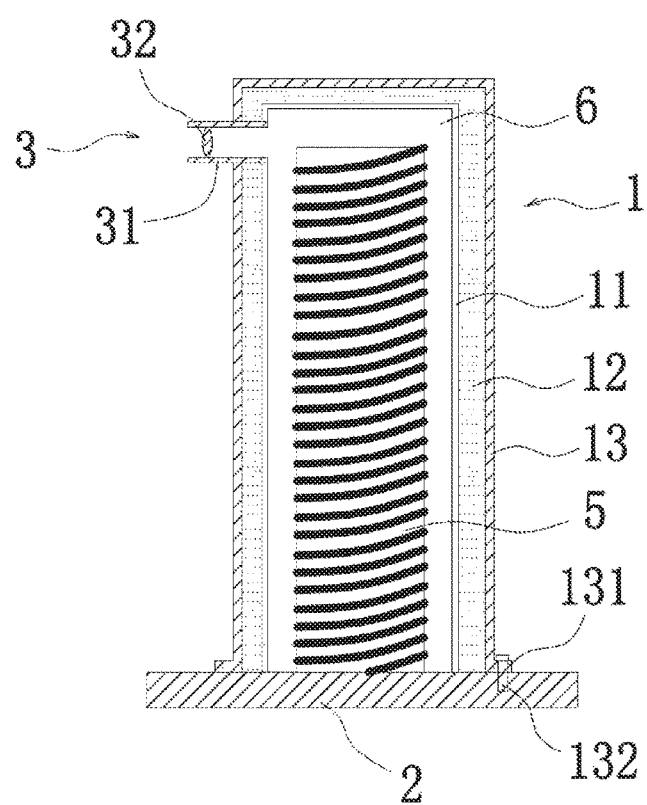
FIG. 2 is a schematic, longitudinal sectional view of a reformer according to the disclosure.
Figure 3:
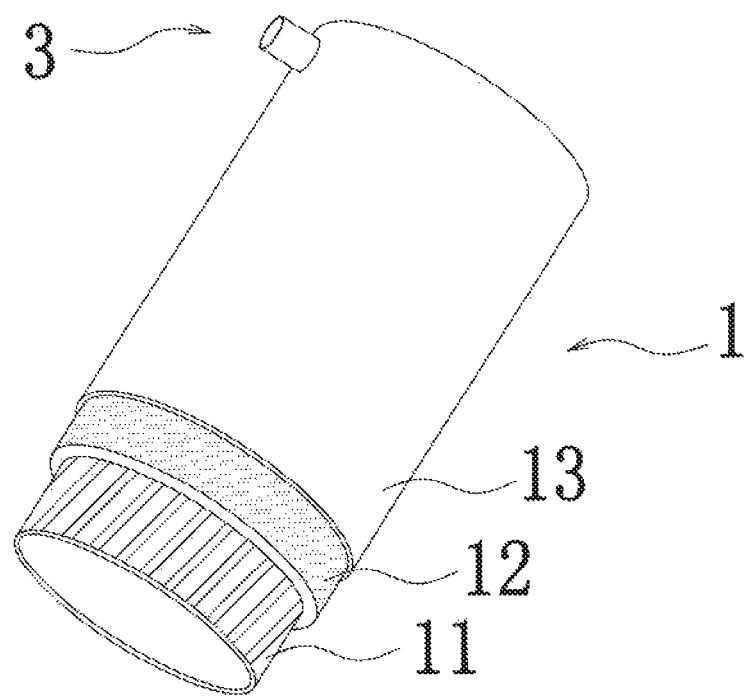
FIG. 3 is a schematic, sectional view of a partial reforming housing according to the disclosure.
Figure 4:
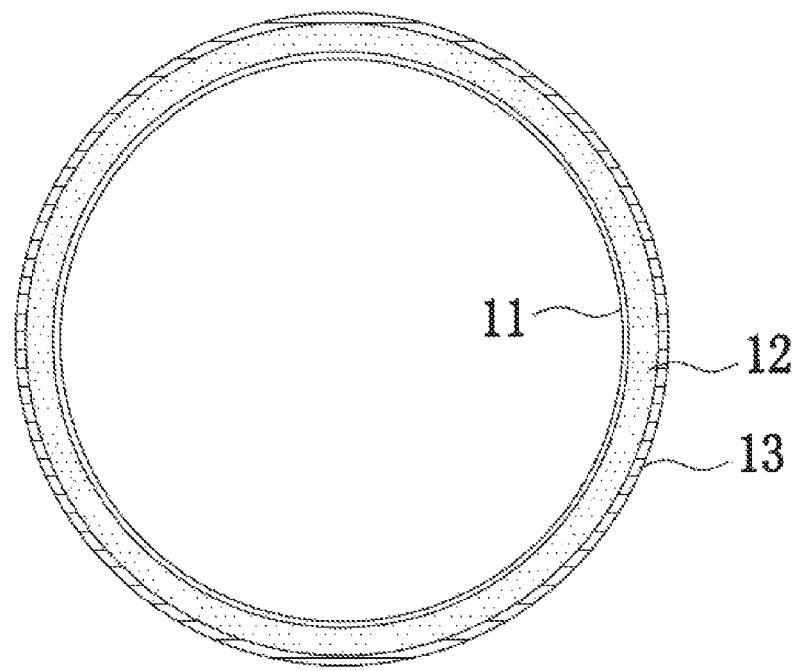
FIG. 4 is a schematic, sectional view of the reformer taken along A-A in FIG. 1.

As shown in FIG. 1, FIG. 2 and FIG. 3, the reformer further includes a reforming base 2 and an exhaust device 3, the reforming base 2 is connected with a bottom of the reforming housing 1, the reforming base 2 is a mica base; the exhaust device 3 is disposed on top of the reforming housing 1, the exhaust device 3 includes an exhaust pipe 31 and a check valve 32 mounted in the exhaust pipe, the exhaust pipe 31 is a mica exhaust pipe, the check valve 32 is a mica check valve.

As shown in FIG. 1 and FIG. 2, the mica external shell 13 of the reforming housing 1 has a bottom belt 131, the bottom belt 131 has a plurality of mounting holes 1311, a bolt 132 is screwed in each of the plurality of mounting holes 1311 respectively, in order to secure the mica external shell 13 on the reforming base 2. In the figures, the bottom belt 131 is formed integrally with the mica external shell 13, three mounting holes 1311 are defined in the bottom belt 131, which can secure the mica external shell 13 on the reforming base 2.

Figure 5:
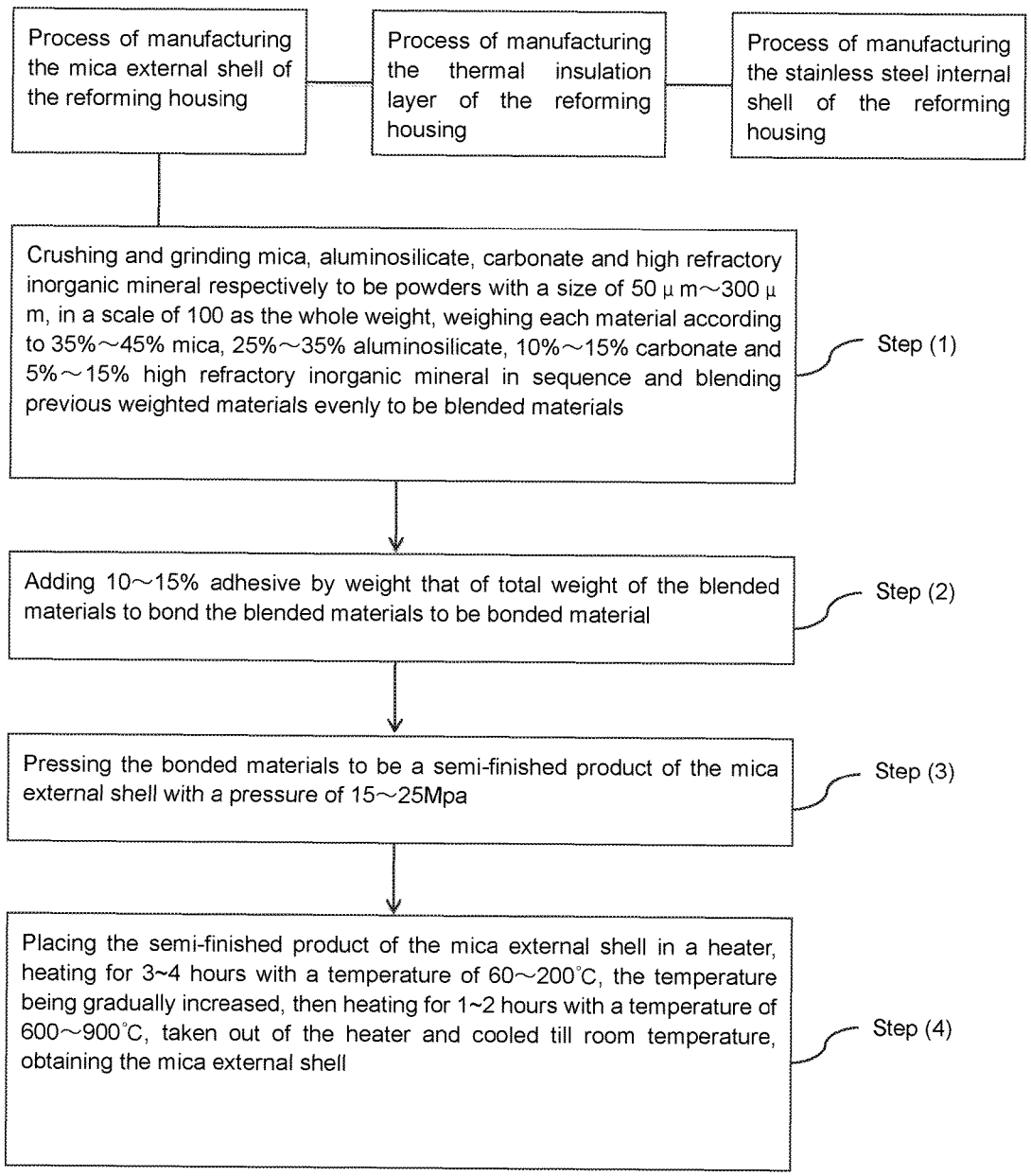
FIG. 5 is a flow chart of a manufacture process of a reformer of a device for preparing hydrogen with methanol and water.

Embodiment two: as shown in FIG. 5, a manufacture process of the reformer of the device for preparing hydrogen with methanol and water includes a process of manufacturing the mica external shell of the reforming housing, a process of manufacturing the thermal insulation layer of the reforming housing and a process of manufacturing the stainless steel internal shell of the reforming housing, the process of manufacturing the mica external shell of the reforming housing includes following steps.

(1) Crushing and grinding mica, aluminosilicate, carbonate and high refractory inorganic mineral respectively to be powders with a size of 50 μm~300 μm, in a scale of 100 as the whole weight, weighing each material according to 35%~45% mica, 25%~35% aluminosilicate, 10%~15% carbonate and 5%~15% high refractory inorganic mineral in sequence and blending previous weighted materials evenly to be blended materials.

(2) Adding 10~15% adhesive by weight that of total weight of the blended materials to bond the blended materials.

(3) Pressing the bonded materials to be a semi-finished product of the mica external shell with a pressure of 15~25 Mpa.

(4) Placing the semi-finished product of the mica external shell in a heater, heating for 3~4 hours with a temperature of 60~200° C., the temperature being gradually increased, then heating for 1~2 hours with a temperature of 600~900° C., taken out of the heater and cooled till room temperature, obtaining the mica external shell.

The process of manufacturing the thermal insulation layer of the reforming housing and the process of manufacturing the stainless steel internal shell of the reforming housing can be achieved by the conventional technique, for which will not be repeated. The mica external shell 13, the thermal insulation layer 12 and the stainless steel internal shell 11 are produced respectively, the thermal insulation layer 12 is mounted in the mica external shell 13, then the stainless steel internal shell 11 is inserted tightly, manufacture of the reforming housing is completed.

Figure 6:
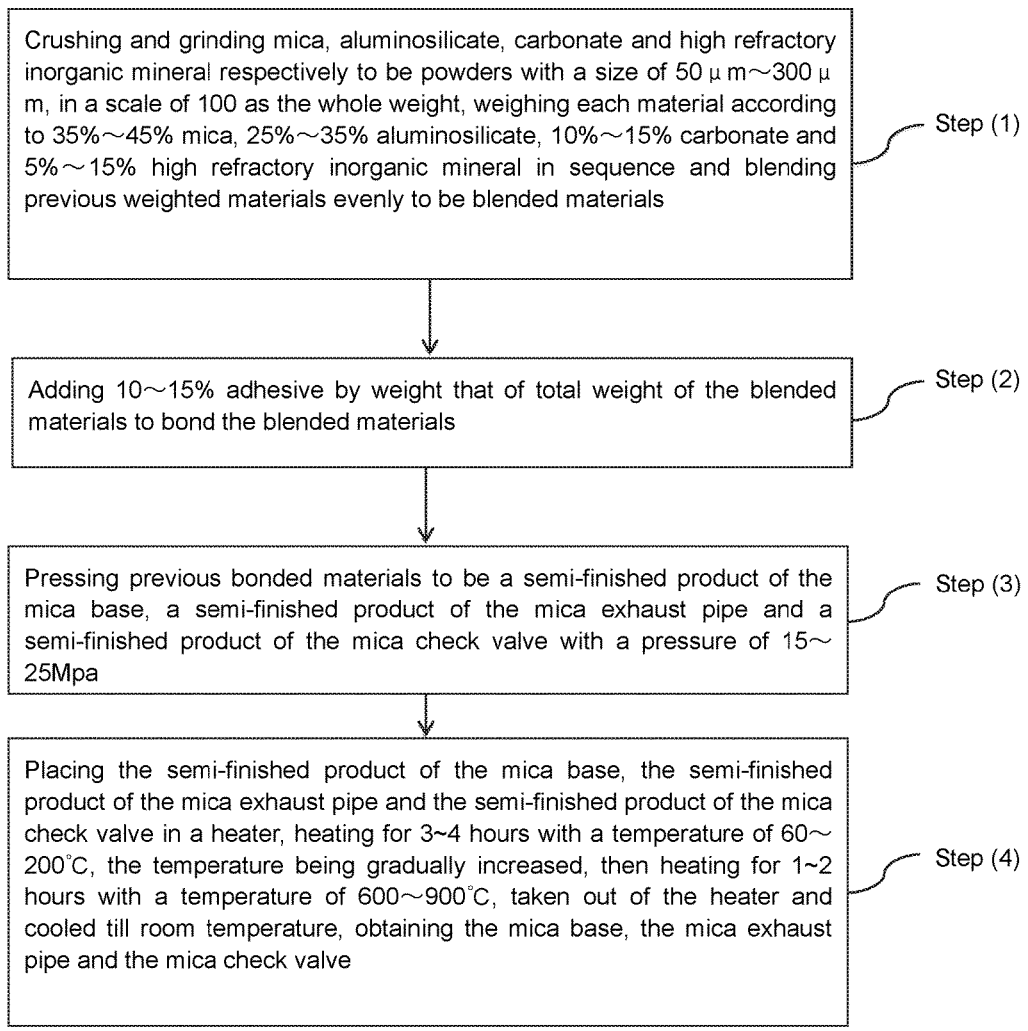
FIG. 6 is a flow chart of another manufacture process of a reformer of a device for preparing hydrogen with methanol and water.

Embodiment three: as shown in FIG. 6, distinguishing from the second embodiment, the manufacture process of the reformer according to the embodiment further includes a manufacture process of a mica base, a mica exhaust pipe and a mica check valve of the reformer, the manufacture process includes following steps.

(1) Crushing and grinding mica, aluminosilicate, carbonate and high refractory inorganic mineral respectively to be powders with a size of 50 μm~300 μm, in a scale of 100 as the whole weight, weighing each material according to 35%~45% mica, 25%~35% aluminosilicate, 10%~15% carbonate and 5%~15% high refractory inorganic mineral in sequence and blending previous weighted materials evenly to be blended materials.

(2) Adding 10~15% adhesive by weight that of total weight of the blended materials to bond the blended materials.

(3) Pressing previous bonded materials to be a semi-finished product of the mica base, a semi-finished product of the mica exhaust pipe and a semi-finished product of the mica check valve with a pressure of 15~25 Mpa.

(4) Placing the semi-finished product of the mica base, the semi-finished product of the mica exhaust pipe and the semi-finished product of the mica check valve in a heater, heating for 3~4 hours with a temperature of 60~200° C., the temperature being gradually increased, then heating for 1~2 hours with a temperature of 600~900° C., taken out of the heater and cooled till room temperature, obtaining the mica base, the mica exhaust pipe and the mica check valve.

In the embodiments above, the aluminosilicate is made of one or more materials selected from the group consisting of kaolinite, pyrophyllite, and montmorillonite, and any combinations thereof. The carbonate is made of one or more materials selected from the group consisting of calcite, dolomite, and magnesite, and any combinations thereof. The high refractory inorganic mineral is made of one or more materials selected from the group consisting of periclase, quartz, and quartz stone, and any combinations thereof. The adhesive is made of one or more materials selected from the group consisting of sodium silicate, epoxy resin, silane, and any combinations thereof.

Furthermore, in the embodiments above, the mica can be muscovite and phlogopite, or artificially synthesized mica, the chemical formula of the muscovite is $KAl_2(AlSi_3O_{10})(OH)_2$, where $SiO_2$ 45.2%, $Al_2O_3$ 38.5%, $K_2O$ 11.8%, $H_2O$ 4.5%, plus a small amount of Na, Ca, Mg, Ti, Cr, Mn, Fe and F, etc. The chemical formula of the phlogopite is $KMg_3(AlSi_3O_{10})(F,OH)_2$, where $K_2O$ is 7~10.3%, MgO is 21.4~29.4%, $Al_2O_3$ is 10.8~17%, $SiO_2$ is 38.7~45%, $H_2O$ is 0.3~4.5%, including a small amount of Fe, Ti, Mn, Na and F, etc. The artificially synthesized mica can be produced by calcining five materials consisting of 55% talc, 9% magnesiumoxide, heavy, 20% potassium fluosilicate, 12% aluminum oxide, and 4% potassium carbonate. Mica employed by the disclosure is not limited by the previous-mentioned sorts.

Above are preferred embodiments of the disclosure, any modifications, equivalent replacements or improvements within the spirit and principles of the embodiments described above should be covered by the protected scope of the disclosure.

Industrial applicability: the disclosure is a reformer of a device for preparing hydrogen with methanol and water and a manufacture process thereof, the reformer can resist corrosion and oxidation during preparing hydrogen, thermal preservation is excellent, without impacting operation and endurance of other components of the device for preparing hydrogen with methanol and water, other benefits can be for example insulation, lightweight and high strength. Therefore, it contains industrial applicability.

What is claimed is:

1. A reformer of a device for preparing hydrogen with methanol and water, comprising a reforming housing, wherein the reforming housing comprises a stainless steel internal shell, a thermal insulation layer and a mica external shell from inside to outside in sequence, a ratio of a diameter of the reforming housing to a thickness of the stainless steel internal shell is 150:0.8~150:2.5, a ratio of the diameter of the reforming housing to a thickness of the thermal insulation layer is 150:10~150:20, a ratio of the diameter of the reforming housing to a thickness of the mica external shell is 150:1.5<150:3.5.

2. The reformer of the device for preparing hydrogen with methanol and water according to claim 1, wherein the ratio of the diameter of the reforming housing to the thickness of the stainless steel internal shell is 150:1.5~150:2, the ratio of the diameter of the reforming housing to the thickness of the thermal insulation layer is 150:14~150:16, the ratio of the diameter of the reforming housing to the thickness of the mica external shell is 150:2~150:3.

3. The reformer of the device for preparing hydrogen with methanol and water according to claim 1, wherein the reformer further comprises a reforming base and an exhaust device, the reforming base is connected with a bottom of the reforming housing, the reforming base is a mica base; the exhaust device is disposed on top of the reforming housing, the exhaust device comprises an exhaust pipe and a check valve mounted in the exhaust pipe, the exhaust pipe is a mica exhaust pipe, the check valve is a mica check valve.

4. The reformer of the device for preparing hydrogen with methanol and water according to claim 3, wherein the mica external shell of the reforming housing has a bottom belt, the bottom belt has a plurality of mounting holes, a bolt is screwed in each of the plurality of mounting holes respectively in order to secure the mica external shell on the reforming base.

5. A manufacture process of the reformer of the device for preparing hydrogen with methanol and water according to claim 1, wherein it comprises a process of manufacturing the mica external shell of the reforming housing, a process of manufacturing the thermal insulation layer of the reforming housing and a process of manufacturing the stainless steel internal shell of the reforming housing, wherein the process of manufacturing the mica external shell of the reforming housing comprises following steps:
(1) crushing and grinding mica, aluminosilicate, carbonate and high refractory inorganic mineral respectively to be powders with a size of 50 μm~300 μm, in a scale of 100 as the whole weight, weighing each material according to 35%~45% mica, 25%~35% aluminosilicate, 10%~15% carbonate and 5%~15% high refractory inorganic mineral in sequence and blending previous weighted materials evenly to be blended materials;
(2) adding 10~15% adhesive by weight that of total weight of the blended materials to bond the blended materials to be bonded material;
(3) pressing the bonded material to be a semi-finished product of the mica external shell with a pressure of 15~25 Mpa;
(4) placing the semi-finished product of the mica external shell in a heater, heating for 3~4 hours with a temperature of 60~200° C., the temperature being gradually increased, then heating for 1~2 hours with a temperature of 600~900° C., taken out of the heater and cooled till room temperature, obtaining the mica external shell.

6. The manufacture process of the reformer of the device for preparing hydrogen with methanol and water according to claim 5, wherein the aluminosilicate is made of one or more materials selected from the group consisting of kaolinite, pyrophillite, montmorillonite, and any combinations thereof.

7. The manufacture process of the reformer of the device for preparing hydrogen with methanol and water according to claim 5, wherein the carbonate is made of one or more materials selected from the group consisting of calcite, dolomite, magnesite, and any combinations thereof.

8. The manufacture process of the reformer of the device for preparing hydrogen with methanol and water according to claim 5, wherein the high refractory inorganic mineral is made of one or more materials selected from the group consisting of periclase, quartz, quartz stone, and any combinations thereof.

9. The manufacture process of the reformer of the device for preparing hydrogen with methanol and water according to claim 5, wherein the adhesive is made of one or more materials selected from the group consisting of sodium silicate, epoxy resin, silane.

10. The manufacture process of the reformer of the device for preparing hydrogen with methanol and water according to claim 5, wherein the manufacture process of the reformer of the device for preparing hydrogen with methanol and water further comprises a manufacture process of a mica base, a mica exhaust pipe and a mica check valve of the reformer, the manufacture process comprises following steps:
(1) crushing and grinding mica, aluminosilicate, carbonate and high refractory inorganic mineral respectively to be powders with a size of 50 μm~300 μm, in a scale of 100 being regarded as the whole weight, weighing each material according to 35%~45% mica, 25%~35% aluminosilicate, 10%~15% carbonate and 5%~15% high refractory inorganic mineral in sequence and blending previous weighted materials evenly to be blended materials;
(2) adding 10~15% adhesive by weight that of total weight of the blended materials to bond the blended materials;
(3) pressing previous bonded materials to be a semi-finished product of the mica base, a semi-finished product of the mica exhaust pipe and a semi-finished product of the mica check valve with a pressure of 15~25 Mpa;
(4) placing the semi-finished product of the mica base, the semi-finished product of the mica exhaust pipe and the semi-finished product of the mica check valve in a heater, heating for 3~4 hours with a temperature of 60~200° C., the temperature being gradually increased, then heating for 1~2 hours with a temperature of 600~900° C., taken out of the heater and cooled till room temperature, obtaining the mica base, the mica exhaust pipe and the mica check valve.

11. The manufacture process of the reformer of the device for preparing hydrogen with methanol and water according to claim 10, wherein the aluminosilicate is made of one or more materials selected from the group consisting of kaolinite, pyrophyllite, montmorillonite, and any combinations thereof.

12. The manufacture process of the reformer of the device for preparing hydrogen with methanol and water according to claim 10, wherein the carbonate is made of one or more materials selected from the group consisting of calcite, dolomite, magnesite, and any combinations thereof.

13. The manufacture process of the reformer of the device for preparing hydrogen with methanol and water according to claim 10, wherein the high refractory inorganic mineral is made of one or more materials selected from the group consisting of periclase, quartz, quartz stone, and any combinations thereof.

14. The manufacture process of the reformer of the device for preparing hydrogen with methanol and water according to claim 10, wherein the adhesive is made of one or more materials selected from the group consisting of sodium silicate, epoxy resin, silane, and any combinations thereof.

* * * * *